(12) United States Patent
Bizjak et al.

(10) Patent No.: US 9,444,332 B2
(45) Date of Patent: Sep. 13, 2016

(54) SYSTEM AND METHOD FOR CONTROLLING A POWER SUPPLY DURING DISCONTINUOUS CONDUCTION MODE

(71) Applicant: Infineon Technologies Austria AG, Villach (AT)

(72) Inventors: Luca Bizjak, Villach (AT); Gerhard Maderbacher, Gleisdorf (AT); Roman Riederer, Villach (AT); Stylianos Perissakis, Villach (AT)

(73) Assignee: Infineon Technologies Austria AG, Villach (AT)

( * ) Notice: Subject to any disclaimer, the term of this patent is extended or adjusted under 35 U.S.C. 154(b) by 283 days.

(21) Appl. No.: 14/047,636

(22) Filed: Oct. 7, 2013

(65) Prior Publication Data

US 2015/0097544 A1    Apr. 9, 2015

(51) Int. Cl.
| | |
|---|---|
| *H02M 3/158* | (2006.01) |
| *H02M 3/156* | (2006.01) |
| *H02J 7/00* | (2006.01) |
| *H02M 1/00* | (2006.01) |

(52) U.S. Cl.
CPC ............... *H02M 3/156* (2013.01); *H02J 7/00* (2013.01); *H02M 3/1588* (2013.01); *H02M 2001/0032* (2013.01)

(58) Field of Classification Search
CPC ................. H02M 3/1588; H02M 2001/0054; H02M 2001/0003; H02M 2001/0032
See application file for complete search history.

(56) References Cited

U.S. PATENT DOCUMENTS

| | | |
|---|---|---|
| 6,956,361 B1 | 10/2005 | Mozipo et al. |
| 7,696,733 B2 | 4/2010 | Osaka |
| 7,944,085 B2 | 5/2011 | Kyono |
| 8,009,448 B2 | 8/2011 | Liu |
| 8,213,189 B2 | 7/2012 | Nishikawa |
| 8,385,089 B2 | 2/2013 | Kyono |
| 8,395,912 B2 | 3/2013 | Usui |

(Continued)

FOREIGN PATENT DOCUMENTS

| | | |
|---|---|---|
| DE | 102007021923 A1 | 1/2009 |
| DE | 102011077174 A1 | 12/2011 |

OTHER PUBLICATIONS

Texas Instruments, "bq24735/725A Battery Charger Evaluation Module," User's Guide, SLUU507A—Jun. 2011—Revised Sep. 2011, 23 pages.

(Continued)

*Primary Examiner* — Harry Behm
(74) *Attorney, Agent, or Firm* — Slater Matsil, LLP

(57) ABSTRACT

In accordance with an embodiment, a controller for a switched mode power supply includes an average current comparator that determines whether an average current within the switched mode power supply is below a current threshold, and a switch signal generation circuit coupled to the average current comparator having switch signal outputs configured to be coupled to a switching circuit of the switched mode power supply. The switch signal generation circuit produces a first switching pattern in a first mode of operation and produces a second switching pattern a second mode of operation. When the average current comparator determines that the average current is below the current threshold, the switch signal generation circuit is operated in a first mode, and when the average current comparator determines that the average current is not below the current threshold, the switch signal generation circuit is operated in a second mode.

24 Claims, 9 Drawing Sheets

(56) References Cited

U.S. PATENT DOCUMENTS

| | | |
|---|---|---|
| 8,416,588 B2 | 4/2013 | Chen |
| 2008/0049453 A1 | 2/2008 | Osaka |
| 2008/0137379 A1* | 6/2008 | Mao ................ H02M 3/157 363/17 |
| 2008/0238392 A1* | 10/2008 | Cheung ............ H02M 3/1584 323/283 |
| 2009/0284991 A1 | 11/2009 | Nishikawa |
| 2009/0284992 A1* | 11/2009 | Kenly .............. H02M 3/156 363/21.06 |
| 2010/0007318 A1* | 1/2010 | Faerber ............ H02M 3/156 323/283 |
| 2011/0051465 A1 | 3/2011 | Usui |
| 2011/0273157 A1* | 11/2011 | Abu-Qahouq ...... H02M 3/156 323/299 |
| 2012/0200271 A1* | 8/2012 | Henzler ............ H02M 3/156 323/235 |
| 2014/0368174 A1* | 12/2014 | Houston ............ H02M 3/158 323/271 |

OTHER PUBLICATIONS

Datasheet, Version 2.0, ICE1HS01G, Half-Bridge Resonant Controller Power Management & Supply Never Stop Thinking, Infineon, 18 pages, Aug. 24, 2009.

* cited by examiner

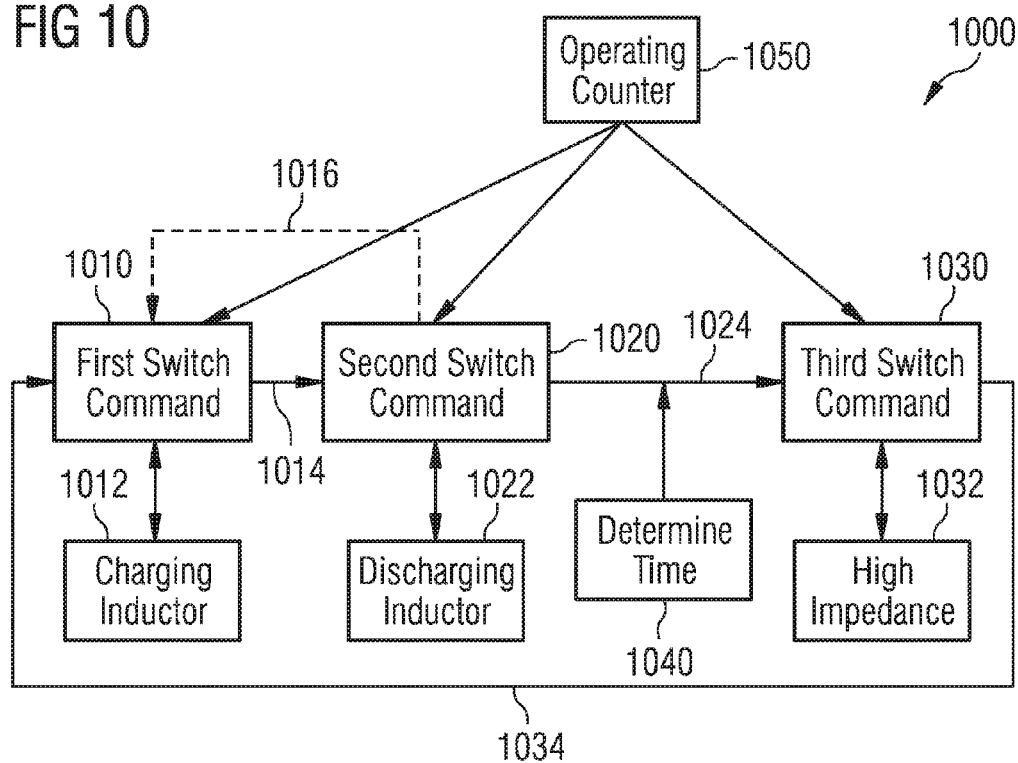
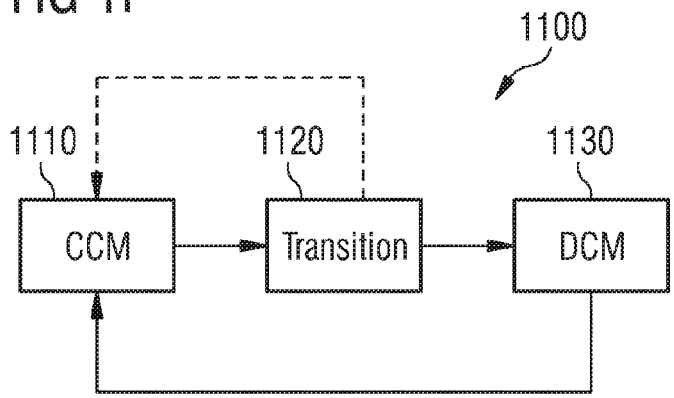
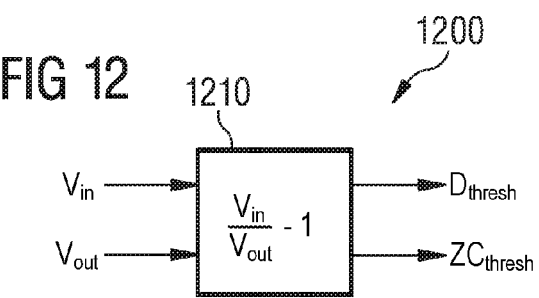

SYSTEM AND METHOD FOR CONTROLLING A POWER SUPPLY DURING DISCONTINUOUS CONDUCTION MODE

TECHNICAL FIELD

The present invention relates generally to electronic circuits and power supplies, and, in particular embodiments, to a system and method for controlling a power supply.

BACKGROUND

Power supply systems are pervasive in many electronic applications from computers to automobiles. Generally, voltages within a power supply system are generated by performing a DC-DC, DC-AC, and/or AC-DC conversion by operating a switch loaded with an inductor or transformer. One class of such systems includes switched mode power supplies (SMPS). An SMPS is usually more efficient than other types of power conversion systems because power conversion is performed by controlled charging and discharging of the inductor or transformer and reduces energy lost due to power dissipation across resistive voltage drops.

An SMPS usually includes at least one switch and an inductor or transformer. Some specific topologies include buck converters, boost converters, and flyback converters, among others. A control circuit is commonly used to open and close the switch to charge and discharge the inductor. In some applications, the current supplied to the load and/or the voltage supplied to the load is controlled via a feedback loop.

In some power supply applications, a switched mode power supply may be operated in two different modes: a continuous conduction mode (CCM) and a discontinuous conduction mode (DCM). During CCM, the switch(es) may be operated to continually charge or discharge the inductor. During DCM, the switch(es) may be operated so as to limit the amount of negative current flowing in the inductor during each cycle in order to improve efficiency. In battery charging applications, CCM may be used during the middle of the charging cycle and DCM may be used near the end of a charge cycle. As the load voltage or battery charge nears the target or supply voltage, the power supply may be operated in DCM in order to reduce the charge removed from the load or battery by negative currents. Such approaches are common in charging applications for energy efficiency and to prevent battery damage.

SUMMARY OF THE INVENTION

In accordance with an embodiment, a controller for a switched mode power supply includes an average current comparator and a switch signal generation circuit coupled to the average current comparator. The average current comparator determines whether an average current within the switched mode power supply is below a current threshold. Included in the switch signal generation circuit are switch signal outputs that may be coupled to a switching circuit of the switched mode power supply. The switch signal generation circuit produces a first switching pattern at the switch signal outputs in a first mode of operation and produces a second switching pattern at the switch signal outputs in a second mode of operation. When the average current comparator determines that the average current is below the current threshold, the switch signal generation circuit is operated in a first mode, and when the average current comparator determines that the average current is not below the current threshold, the switch signal generation circuit is operated in a second mode.

BRIEF DESCRIPTION OF THE DRAWINGS

For a more complete understanding of the present invention, and the advantages thereof, reference is now made to the following descriptions taken in conjunction with the accompanying drawing, in which:

FIG. 10 illustrates a block diagram of an embodiment method of operating a switching power supply circuit;

FIG. 11 illustrates a block diagram of another embodiment method of operating a switching power supply circuit; and FIG. 12 illustrates a block diagram of an embodiment calculation block.

Corresponding numerals and symbols in the different figures generally refer to corresponding parts unless otherwise indicated. The figures are drawn to clearly illustrate the relevant aspects of the embodiments and are not necessarily drawn to scale.

DETAILED DESCRIPTION OF ILLUSTRATIVE EMBODIMENTS

The making and using of various embodiments are discussed in detail below. It should be appreciated, however, that the various embodiments described herein are applicable in a wide variety of specific contexts. The specific embodiments discussed are merely illustrative of specific ways to make and use various embodiments, and should not be construed in a limited scope.

Description is made with respect to various embodiments in a specific context, namely in power converter circuits. Various embodiments described herein include AC-DC or DC-DC voltage converters, switching power supply systems and circuits, battery charging circuits, current comparator circuits, power supply controllers, and other converter circuits. In other embodiments, aspects may also be applied to other applications involving any type of converter or load driving circuits using integrated or discrete components according to any fashion of electronics as known in the art.

According to embodiments described herein, a switching power supply system and method of operating the switching power supply system includes operating the switching power supply system in at least two modes, including at least continuous conduction mode (CCM) and discontinuous conduction mode (DCM). CCM may include cyclically charging and discharging an inductive element which is coupled to a load, and DCM may include cyclically charging for a time, discharging for a time, and connecting in high impedance for a time the inductive element. In various embodiments, the switching power supply system is configured to switch from CCM to DCM once an average current flowing in the inductive element drops below a first threshold. This average current may be determined over the course of a number of switching cycles. The switching power supply system is also configured to, during DCM, predict a time at which the current flowing in the inductor becomes zero. In some embodiments, this prediction is performed without making a direct measurement of the inductor current. The various embodiments described herein provide details of structures and operations according to various embodiments of the invention.

Figure 1A:
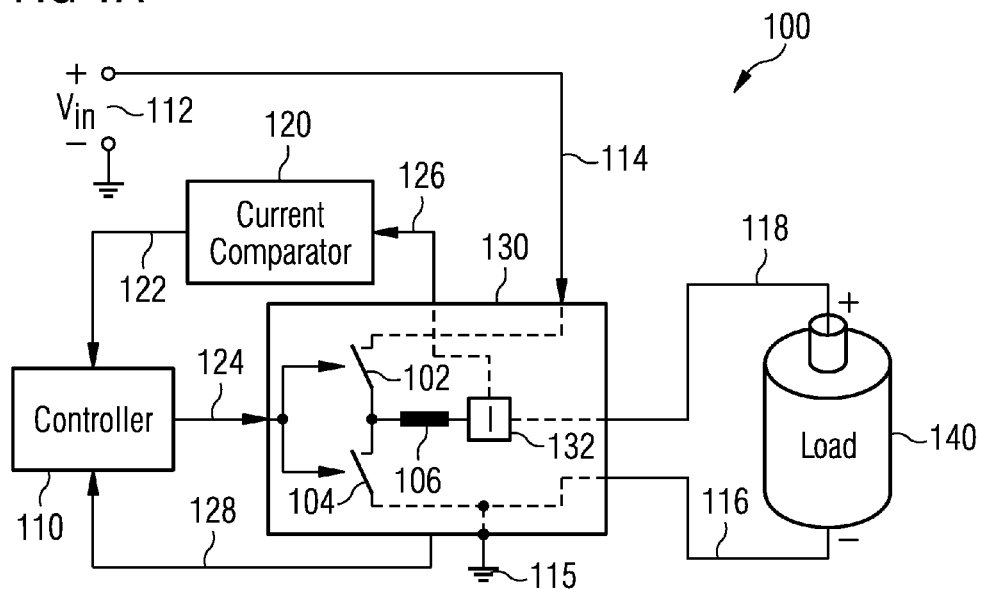
FIGS. 1a-b illustrate a block diagram of an embodiment switching power supply system and control signal waveforms for an embodiment power supply controller.

FIG. 1a illustrates a block diagram of an embodiment switching power supply system 100 with a controller 110, a current comparator 120, a switching converter circuit 130, and a load 140. According to an embodiment, switching converter circuit 130 provides a positive voltage line 118 and a negative voltage line 116 to load 140. Switching converter circuit 130 receives an input voltage 112 of magnitude $V_{in}$ and is referenced to node 115. In various embodiments, node 115 may be a ground node or may be a reference voltage other than ground.

According to an embodiment, switching converter circuit 130 receives a switching control signal 124 from controller 110 and provides feedback signal 128 to controller 110 and a measurement signal 126 to current comparator 120. In various embodiments, measurement signal 126 is a voltage and/or current measurement provided from measurement block 132 and corresponds to a current supplied to load 140. Measurement signal 126 is connected to current comparator 120, which compares measurement signal 126 with a threshold value and provides a comparison signal 122 to controller 110. In some embodiments, comparison signal 122 conveys a comparison result between the current supplied to load 140 and the threshold value. In various embodiments, current comparator 120 may perform a current comparison between a current supplied to load 140 and a threshold current.

In some embodiments, controller 110 may be a proportional integral derivative (PID) controller. Alternatively, controller 110 may be implemented as a current controller 110 capable of receiving a current measurement signal 126 directly. In such an embodiment, current comparator 120 may be omitted and a current comparison is performed in current controller 110. In further embodiments, current controller 110 may be a peak current controller 110 that measures a peak current supplied to load 140 via current measurement signal 126. In other embodiments, current controller 110 may be an average current controller 110 that measures an average current supplied to load 140 via current measurement signal 126.

Controller 110 receives both comparison signal 122 from current comparator 120 and feedback signal 128 from switching converter circuit 130. According to various embodiments, feedback signal 128 includes information about a voltage across load 140, a current entering or exiting load 140, or both the voltage of load 140 and the current through load 140. Although depicted as single lines, it should be noted that the connections depicted in FIG. 1a illustrate connections and may include single connections or multiple connections (such as bus lines). In an embodiment, controller 110 uses comparison signal 122 and feedback signal 128 to determine switching control signal 124, which is provided to switching converter circuit 130.

According to a specific embodiment, load 140 is a battery and power supply system 100 is a battery charging system. According to a specific embodiment, load 140 is being charged to a voltage lower than input voltage 112 on line 114. In alternative embodiments, load 140 may be charged to about input voltage 112 (i.e. a voltage of about or load 140 may be charged to a load not equal to $V_{in}$. Charging of load 140 to a final voltage is achieved by switching converter circuit 130. In the embodiment, switching converter circuit 130 contains an inductor 106 and switches 102 and 104 connected to inductor 106. Switches 102 and 104 are opened and closed in order to apply a voltage input to inductor 106 to charge and discharge inductor 106 and supply a current to load 140. According to a specific embodiment, switching converter circuit comprises a switched mode power supply (SMPS). Switches 102 and 104 are controlled by switching control signal 124 received from controller 110.

In an embodiment, controller 110 determines a duty cycle for opening and closing switches 102 and 104. Power supply system 100 may be operated in two different modes of operation: continuous conduction mode (CCM) and discontinuous conduction mode (DCM). Controller 110 may determine the duty cycle of switches 102 and 104 differently in CCM and DCM. In some embodiments, controller 110 transitions from the CCM to DCM according to comparison signal 122, which may be, for example, an enable signal for transitioning from the first mode of operation to the second mode of operation. Comparison signal 122 may be enabled when current supplied to load 140 goes below a threshold value. Alternatively, comparison signal 122 may be disabled when current supplied to load 140 goes below a certain value.

Figure 1B:
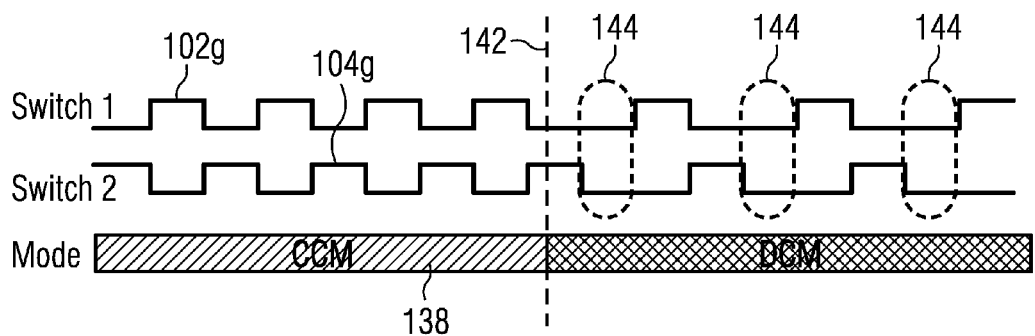

FIG. 1b illustrates embodiment control signal waveforms for a power supply controller 110. Upper switch waveform 102g is a control signal applied to a control terminal of switch 102 and lower switch waveform 104g is a control signal applied to a control terminal of switch 104. According to the embodiment shown, if upper switch waveform 102g is high, switch 102 is closed and is lower switch waveform 104g is high, switch 104 is closed. Switches 102 and 104 are operated in two different modes indicated by mode of operation 138. When mode of operation 138 is CCM, either switch 102 or 104 is closed. From another perspective, during CCM inductor 106 is either charging through switch 102 or discharging through switch 104. In the embodiment shown, when mode of operation 138 is CCM, upper switch waveform 102g and lower switch waveform 104g are inverse of each other. According to an embodiment, controller 110 will determine a duty cycle for controlling switches 102 and 104. In the embodiment shown, the switch control duty cycle for upper switch waveform 102g and lower switch waveform 104g is about 50%, however, the actual duty cycle may vary during operation accordingly to include various other duty cycles. In various specific embodiments, CCM may be referred to as the second mode operation. In an alternative embodiment, CCM may be referred to as the first mode operation.

With continued reference to FIG. 1b, after transition 142 controller 110 switches power supply system 100 from operating in CCM to DCM as indicated by mode of operation 138. During DCM, upper switch waveform 102g and lower switch waveform 104g exhibit a tristate or high impedance configuration in regions 144 when both switches 102 and 104 are open. In an example sequence of operation, upper switch waveform 102g goes high, closing switch 102 and charging inductor 106. Next, lower switch waveform 104g goes high when upper switch waveform 102g goes low, thus closing switch 104, opening switch 102, and discharging inductor 106. Finally, lower switch waveform 104g goes low as upper switch waveform 102g remains low during a high impedance period in regions 144 when inductor 106 is not connected to either a charging node or a discharging node. According to embodiments described herein, a time to open both switches 102 and 104 in order to enter the high impedance period in regions 144 is determined such that when both switches are opened, the current in inductor 106 is close to zero. In various embodiments, an inductor current zero crossing may be predicted during DCM as part of determining the time to enter high impedance mode. A controller, such as controller 110, may be used to predict the inductor current zero crossing during DCM. In various specific embodiments, DCM may be referred to as the first mode of operation. In an alternative embodiment, DCM may be referred to as the second mode of operation.

Figure 2:
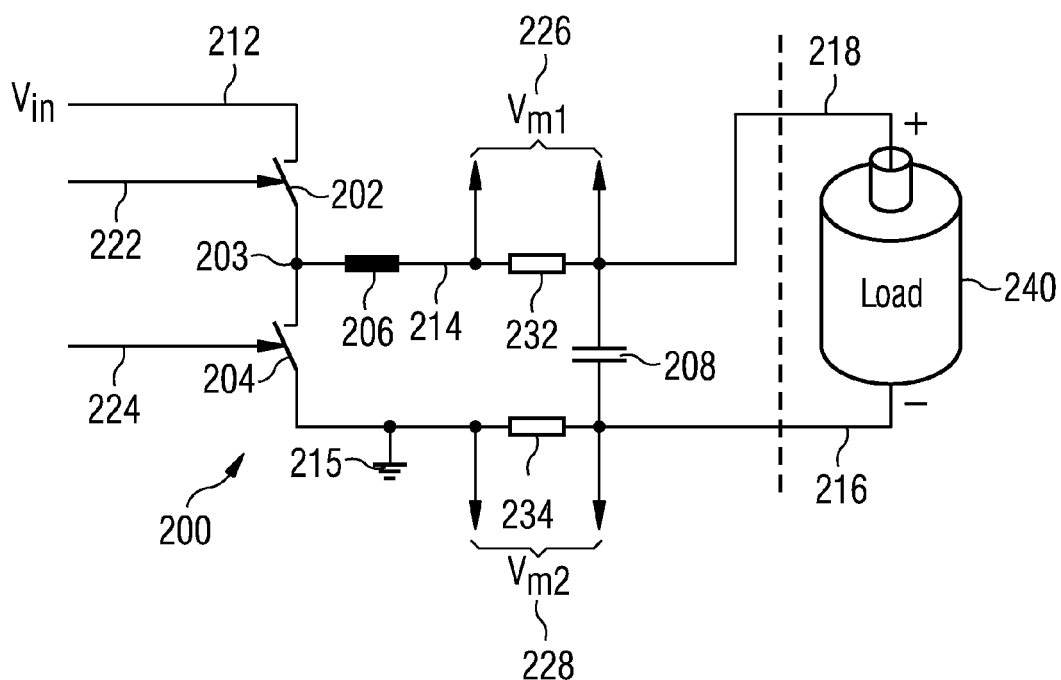
FIG. 2 illustrates a schematic of an embodiment switching power supply circuit.

FIG. 2 illustrates a schematic of an embodiment switching power supply circuit 200 having a first switch 202, a second switch 204, and an inductor 206. Switching power supply circuit 200 may correspond to an embodiment switching converter circuit 130 as described with reference to FIGS. 1a-b. In an example embodiment, when switch 202 is closed, forming a conducting path between input node 212 and node 203, current flows into the inductor 206 from the input node 212. Switch 204 may be open, or non-conducting, when switch 202 is closed, or conducting. Next, switch 202 is opened and switch 204 is closed. Characteristic of an inductor, current continues to flow through inductor 206, resistor 232, and into load 240 when switch 204 is closed. Because inductor 206 is coupled to reference node 215 and not to a supply or input node (such as 212) when switch 204 is closed and switch 202 is open, current flowing through inductor 206 may decrease in an approximately linear fashion.

In the embodiment shown, a control signal coupled to control terminal 222 opens and closes switch 202 and a control signal coupled to control terminal 224 opens and closes switch 204. When switch 202 is closed and switch 204 is open, current flowing through inductor 206 increases. On the other hand, when switch 204 is closed and switch 202 is open, current flowing into inductor 206 decreases. In some embodiments, opening and closing switches 202 and 204 supplies a current through inductor 206 to load 240. In an example embodiment, the current supplied to load 240 may be larger for a time period and smaller for another time period. In an example involving battery charging, the current is large during regular charging and small during final charging (i.e. near an end of a charging cycle when the load/battery is almost fully charged). In the embodiment shown, a capacitor 208 connected in parallel with load 240 acts as a low pass filter and reduces supply ripple across load 240.

In the embodiment depicted in FIG. 2, output signal 226 and output signal 228 may be connected as current or voltage measurement feedback to control circuitry (not shown in FIG. 2). Resistors 232 and 234 may have known resistances, so that voltage differences $V_{m1}$ and $V_{m2}$ may be used to calculate the current supplied to or passing through load 240 using Ohm's law.

In the embodiment depicted in FIG. 2, switch 202 is coupled between input node 212, having a voltage signal $V_{in}$, and node 203 and switch 204 is coupled between reference node 215 and node 203. Inductor 206 is coupled between node 203 and node 214. Resistor 232 is coupled to inductor 206 at node 214 and resistor 234 is coupled to reference node 215. Capacitor 208 is coupled in parallel with load 240 between resistor 232 and resistor 234 via nodes 218 and 216. A voltage difference across resistor 232 is provided as an output signal 226 depicted as $V_{m1}$ and a voltage difference across resistor 234 is provided as an output signal 228 depicted as $V_{m2}$.

In some embodiments, when a small amount of current flows through inductor 206, both switches 202 and 204 may be opened at the same time. In various embodiments, opening both switches at the same time is done in DCM and corresponds to a high impedance or tristate period. Opening both switches 202 and 204 at the same time may prevent a negative current through inductor 206 that would remove charge from load 240. In some embodiments, the current supplied to load 240 by the switches 202 and 204 and the inductor 206 is controlled in order to avoid negative currents that may discharge a battery connected as load 240. In some embodiments, the current supplied to load 240 by switches 202 and 204 and inductor 206 may be controlled in order to avoid supplying too much current to prevent overcharging of a battery connected as load 240.

In various embodiments, both switches 202 and 204 are opened at the same time when as little current as possible is flowing in inductor 206. As described with reference to FIG. 1b, an inductor current zero crossing may be predicted to facilitate opening both switches 202 and 204 during DCM in close vicinity to the current zero crossing. However, the small amount of current still flowing in inductor 206 may continue to flow after both switches 202 and 204 are opened. In some embodiments, current may flow through body diodes (not shown) of switches 202 and/or 204. In a particular embodiment, a negative current from inductor 206 (i.e. flowing into switch 204) will continue flowing through the body diode of switch 204 as energy stored in inductor 206 is dissipated. In an alternative embodiment, the small amount of current flowing in inductor 206 may flow back and forth between the switch capacitance of switches 204 and/or 202 and the inductor.

Figure 3:
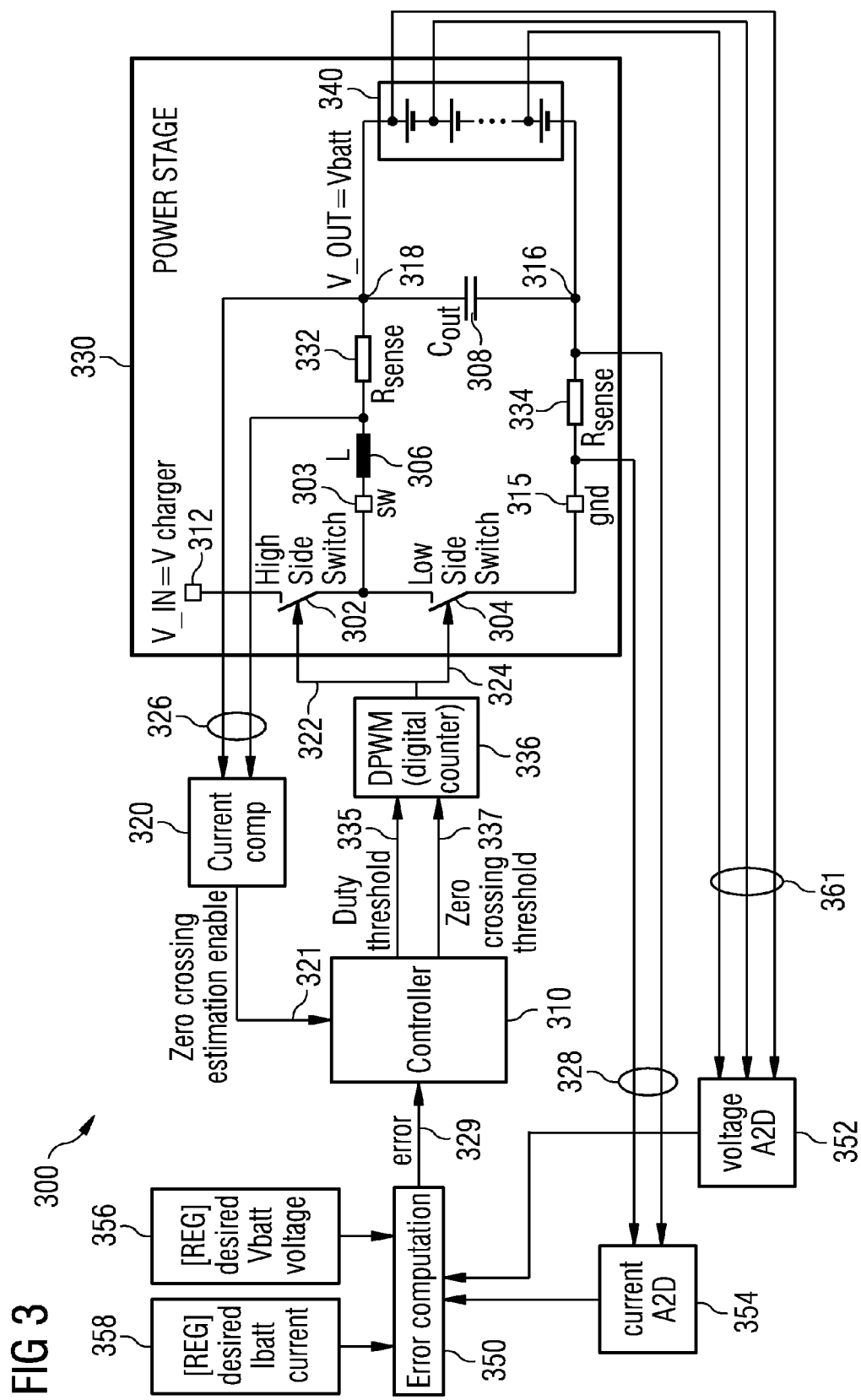
FIG. 3 illustrates a block diagram of an embodiment power supply system.

FIG. 3 illustrates a block diagram of an embodiment power supply system 300 having a switching power supply in power stage 330 which supplies a load 340 by operating switches 302 and 304 in at least two modes of operation: CCM and DCM. In some embodiments, power supply system 300 transitions from CCM to DCM when an average current supplied to load 340 goes below a threshold stored, programmed, or provided to current comparator 320. In both CCM and DCM, controller 310 may determine a duty cycle for controlling switches 302 and 304 based on an error computation related to an output voltage or current supplied to load 340. In DCM, controller 310 may further predict an inductor current zero crossing threshold for enabling tristate operation of switches 302 and 304.

In the embodiment shown in FIG. 3, power supply system 300 includes a controller 310, a power stage 330, a current comparator 320, and a digital pulse width modulation (DPWM) block 336. Power stage 330 includes a switching power supply circuit similar to switching power supply circuit 200 shown in FIG. 2. Power stage 330 includes a high side switch 302 coupled between a voltage input node 312 and a switching node 303 and a low side switch 304 coupled between switching node 303 and reference node 315. In some embodiments, reference node 315 is connected to ground. Inductor 306 and resistor 332 are coupled in series between switching node 303 and output node 318. Load 340 and capacitor 308 are coupled in parallel between output node 318 and output node 316. Resistor 334 is coupled between reference node 315 and output node 316.

According to some embodiments, switch control signal 322 opens and closes switch 302 and switch control signal 324 opens and closes switch 304 in order to charge and discharge inductor 306. DPWM block 336 provides control signals 322 and 324. In various embodiments, DPWM block may be a digital counter. Controller 310 provides a first threshold signal 335 and a second threshold signal 337 to DPWM block 336. In some embodiments, the first threshold signal 335 corresponds to a switching duty cycle between high side switch 302 and low side switch 304. The second threshold signal 337 may correspond to a zero crossing threshold. In some embodiments, the second threshold signal 337 is used to indicate when both switches 302 and 304 should be opened simultaneously. According to an embodiment, the second threshold signal 337 is used during DCM operation of a switching power supply. Operation of switches 302 and 304 as well as the first and second threshold signals will be described further below.

In some embodiments, current comparator 320 provides an enable signal 321 to controller 310. Current comparator 320 may be a slow current comparator such as an averaging current comparator that averages current over a number of cycles. Current comparator 320 receives a voltage signal 326 from a voltage difference across resistor 332 and determines enable signal 321 based on a current comparison between a threshold current and a current supplied to load 340 and passing through resistor 332. In various embodiments, the threshold current used by current comparator 320 is programmable and may be changed in response to system characteristics and requirements. In some embodiments, the current supplied to the load is determined using Ohm's law and voltage signal 326. Controller 310 may operate DPWM block 336, and consequently switches 302 and 304, in two different modes: CCM and DCM. In some embodiments, enable signal 321 may cause controller 310 to switch between CCM and DCM.

With further reference to FIG. 3, a current analog to digital (A2D) block 354 may provide a current measurement from load 340 to error computation block 350. Current A2D block 354 receives an analog voltage signal 328 corresponding to a voltage difference across resistor 334, converts the analog signal to a digital signal, and provides the digital signal corresponding to a voltage measurement from resistor 334 to error computation block 350 (which can be used to calculate current through resistor 334 based on Ohm's law). Voltage A2D block 352 receives analog voltage signals 361 from load 340, converts the analog signal to a digital signal, and provides the digital signal corresponding to a voltage measurement from load 340 to error computation block 350. Error computation block 350 computes an error signal 329 which is provided to controller 310. In various embodiments, controller 310 uses error signal 329 to determine first and second threshold signals 335 and 337. In some embodiments, error signal 329 may be computed by error computation block 350 with the aid of look-up tables 356 and 358. Look-up tables 356 and 358 may include target currents and/or voltages and corresponding error signals based on current and voltage measurement signals from current A2D block 354 and voltage A2D block 352. In some embodiments, look-up tables 356 and 358 are implemented as programmable registers. In other embodiments, look-up tables 356 and 358 may be implemented using any type of addressable memory.

Figure 4:
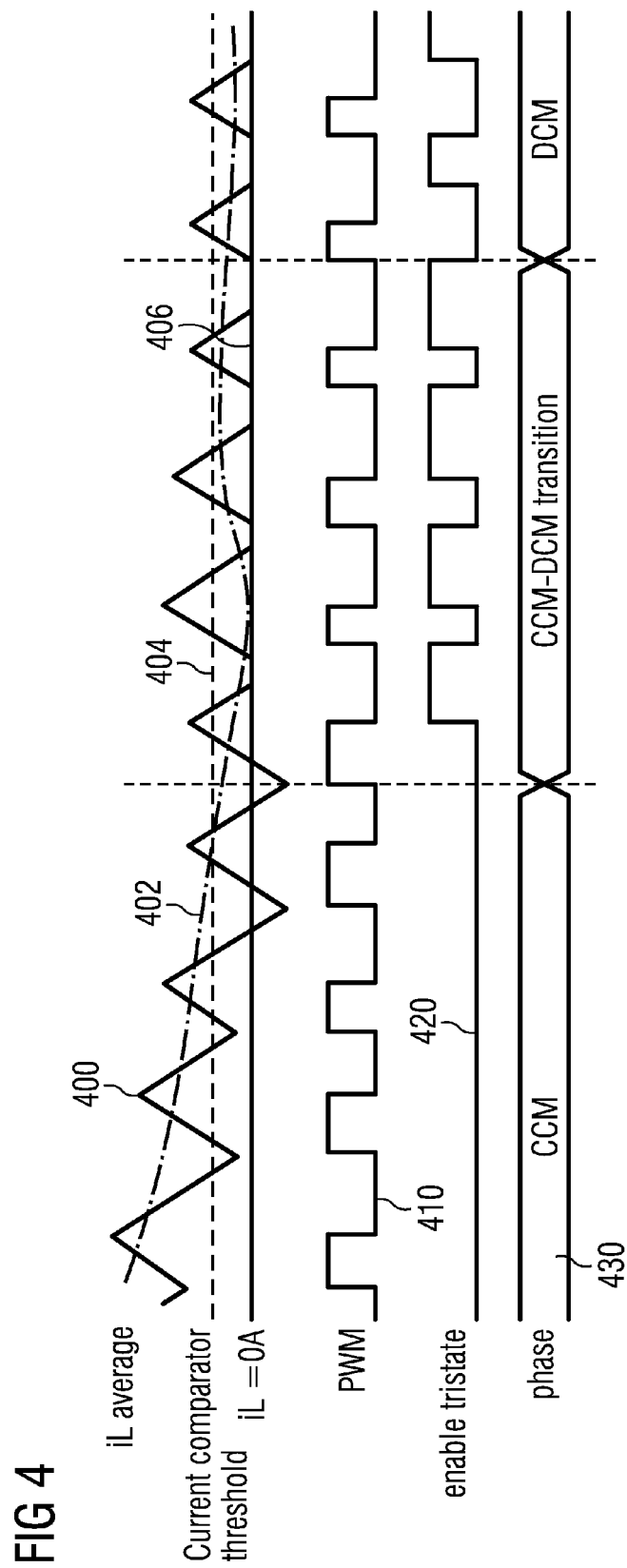
FIG. 4 illustrates a waveform diagram of an embodiment power supply system.

FIG. 4 illustrates a waveform diagram of an embodiment power supply system showing inductor current signal 400, pulse width modulated (PWM) signal 410, tristate enable signal 420, and control mode 430 during various modes of operation. The embodiment power supply system described in FIGS. 4, 5, 8, and 9 may correspond to figures described herein (such as FIGS. 1-3) or to other switching power supply systems. As shown in FIG. 4, inductor current signal 400 increases and decreases in response to PWM signal 410. When PWM signal 410 is high, inductor current signal 400 increases and when PWM signal 410 is low, inductor current signal 400 decreases. Also shown are average inductor current signal 402, current threshold 404, and the zero current level 406.

During operation, an embodiment power supply system may operate in different modes. FIG. 4 depicts an embodiment having two primary modes of operation and a transition mode between the two primary modes. Control mode 430 depicts the two modes of operation and the transition: CCM, transition, and DCM. In an embodiment of CCM, tristate enable signal 420 is not asserted and inductor current signal 400 may remain positive (i.e. not below zero current level 406). As shown by the inductor current signal 400, the inductor current may become negative as the current is decreasing during CCM. In some embodiments, a negative inductor current is avoided by switching to DCM.

In various embodiments, average inductor current signal 402 is used to indicate when to change from CCM to DCM. Particularly, if average inductor current 402 is below current threshold 404, the mode of operation may change. In one embodiment, the mode changes from CCM to DCM when average inductor current signal 402 is below current threshold 404. In various embodiments, current threshold 404 is programmable. A transition period or mode may be helpful in some embodiments. As shown in FIG. 4, when average inductor current signal 402 is below current threshold 404, control mode 430 changes from CCM to the CCM-DCM transition mode. In some embodiments, the CCM-DCM transition mode includes a set number of cycles. In a specific embodiment, the number of cycles ranges from 1 to 128.

According to various embodiments, the CCM-DCM transition mode provides time for a controller to calculate a new duty-cycle for DCM for high side and low side switches and may provide time for a control loop to cause the inductor current to become more stable. In specific embodiments, the low side switch is turned off during CCM-DCM transition mode, which may prevent negative current in the inductor. According to some embodiments, when the low side switch is turned off, average inductor current signal 402 may increase. In such an embodiment, the controller may maintain control mode 430 in CCM-DCM transition mode even if average inductor current signal 402 rises above current threshold 404. In some embodiments, the CCM-DCM transition mode may be very short or omitted because the new duty cycle may be pre-calculated for a particular system or the controller used may be very fast. After the CCM-DCM transition mode, control mode 430 may change to DCM.

In an embodiment, during the CCM-DCM transition mode, tristate enable signal 420 is asserted when PWM signal 410 is low. Asserting tristate enable signal 420 may indicate that all switches connected to an inductor are open. According to various embodiments, tristate enable signal 420 corresponds to turning off both a low side switch and a high side switch and does not necessarily include a separate physical control signal apart from the two control signals for the high and low side switches. For example, asserting tristate enable signal 420 may indicate that switches 302 and 304 are both open simultaneously in FIG. 3. According to an alternative embodiment, tristate enable signal 420 includes a physical control signal attached to the high and low side switches.

In some embodiments, during the CCM-DCM transition mode, inductor current flows through a body diode of the low side transistor when tristate enable signal 420 is asserted. In an embodiment, during DCM, tristate enable signal 420 is asserted sometimes when PWM signal 410 is low. According to an embodiment, during DCM, tristate enable signal 420 is asserted when inductor current signal 400 is zero or below zero. In some embodiments, a point where inductor current signal 400 goes to zero is predicted and not directly measured in a control block when control mode 430 is operating in DCM.

Figure 5:
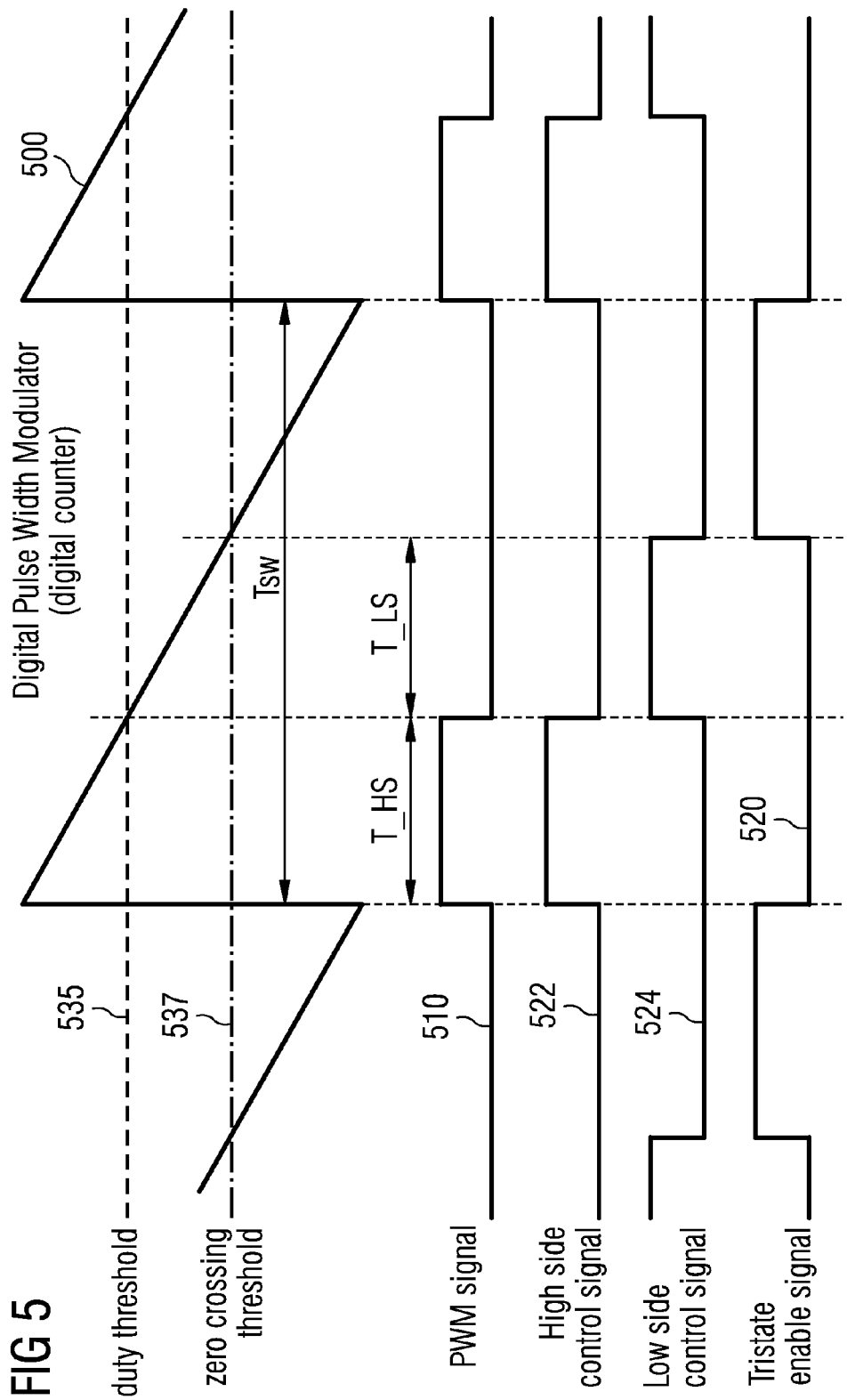
FIG. 5 illustrates a waveform diagram of an embodiment power supply system.

FIG. 5 illustrates a waveform diagram of an embodiment power supply system during DCM operation. A cycle is depicted during which PWM count signal 500 is decreasing. In an embodiment, as PWM count signal 500 reaches certain thresholds, different switches are opened or closed. In an embodiment, high side control signal 522 is a control signal for a switch coupled to an input voltage (such as switch 302 in FIG. 3) and low side control signal 524 is a control signal for a switch coupled to a reference node (such as switch 304 in FIG. 3).

In the embodiment depicted in FIG. 5, control signal 522 is asserted during a first time period T_HS (time high side), control signal 524 is asserted for a second time period T_LS (time low side), and enable tristate signal 520 is asserted for the remainder of a cycle period Tsw (i.e. Tsw−(T_HS+T_LS)). According to various embodiments, enable tristate signal 520 corresponds to a time period when control signals 522 and 524 are both low (or disabled) and does not include a separate physical control signal. In other embodiments, enable tristate signal 520 may be implemented as a physical control signal that disables both the high and low side switches.

T_HS may correspond to the time when PWM count signal 500 decreases from its start to duty threshold 535, T_LS may correspond to the time when PWM count signal 500 decreases from duty threshold 535 to zero crossing threshold 537, and the remaining time corresponds to counting out the rest of period Tsw. In other embodiments, an increasing counter may be implemented that counts up to a duty threshold. According to the embodiment shown, time period T_HS may correspond to duty threshold 535 which is computed based on an error signal determined through feedback from a power supply load (such as error signal 329 in FIG. 3). In various embodiments, time period T_LS may correspond to zero crossing threshold 537 which is estimated according to the following equation, $$T\_LS = T\_HS * \left(\frac{V_{in}}{V_{out}} - 1\right)$$

where $V_{in}$ is a supplied input voltage to the power supply system, and $V_{out}$ is a voltage on a load of the power supply system. In some embodiments, T_LS is calculated in a control block (such as controller 310 in FIG. 3). In various embodiments, zero crossing threshold 537 is an estimated point when current flowing through an inductor to the load reaches zero.

Figure 6:
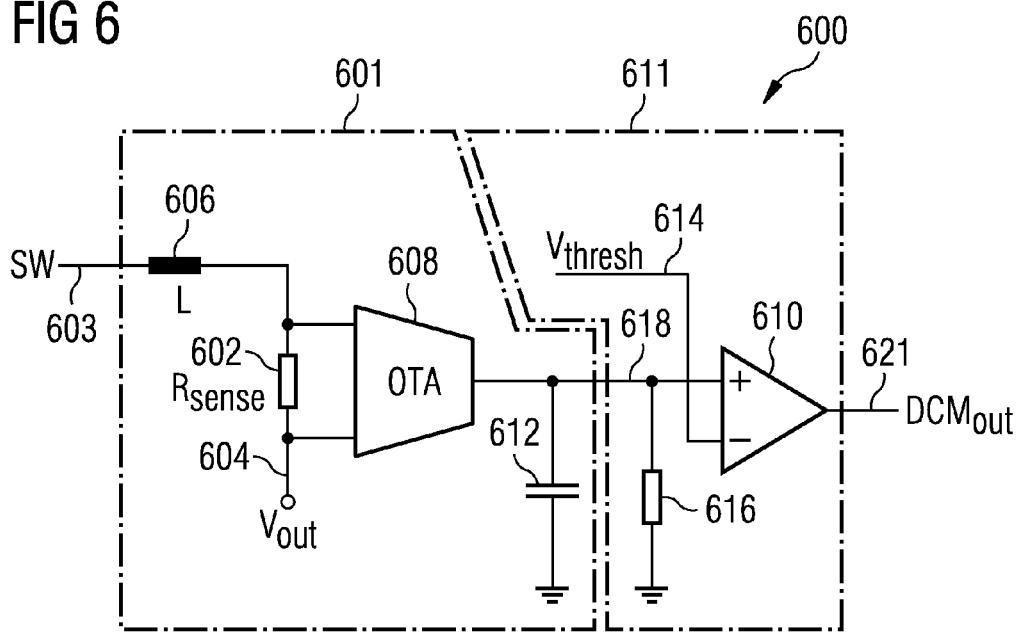
FIG. 6 illustrates a schematic of an embodiment current comparator circuit.

FIG. 6 illustrates a schematic of an embodiment current comparator circuit 600 attached across a sense resistor 602. As shown, current comparator circuit 600 includes an average current measurement circuit 601 and a comparator 611. Inductor 606 is connected in series with resistor 602 between a first node 603 and a second node 604. In some embodiments, node 603 corresponds to switching node 303 in FIG. 3 and node 604 corresponds to node 318 in FIG. 3. A current flowing through resistor 602 causes a voltage across resistor 602 which determines a response of the current comparator circuit 600.

In the embodiment shown in FIG. 6, the voltage across resistor 602 is used as an input to an operational transconductance amplifier (OTA) 608. OTA 608 may convert the input voltage to an output current flowing into node 618. Node 618 is connected to a positive terminal of differential amplifier 610. The current flowing into node 618 may produce a voltage on node 618 which is compared by differential amplifier 610 to a threshold voltage supplied by threshold input 614 to a negative input of differential amplifier 610. Output node 621 corresponds to a result of the comparison between the threshold voltage on input 614 and the output of OTA 608. In the embodiment shown, capacitor 612 and resistor 616 are connected in parallel between node 618 and a reference node. In various embodiments, the reference may be ground. Capacitor 612 may prevent voltage spikes or jumps and resistor 616 may provide a current path to a reference node. Capacitor 612 may also filter and/or average the voltage signal on node 618. In alternative embodiments, average current measurement circuit 601 and comparator 611 may be implemented using other circuits and methods known in the art.

According to an embodiment, output node 621 may be used as an enable signal for a controller (such as controller 310 and enable signal 321 in FIG. 3). In various embodiments, output node 621 may provide a signal to enable or disable a first or second operating mode within a controller. In some embodiments, $V_{thresh}$ on input 614 is chosen as a threshold voltage that corresponds to a particular current value flowing through inductor 606 and resistor 602. If current flowing through inductor 606 and resistor 602 drops below a specific level corresponding to a voltage on node 618 less than $V_{thresh}$, output node 621 may change sign. In various embodiments, output node 621 may produce an active high signal or an active low signal.

Figure 7:
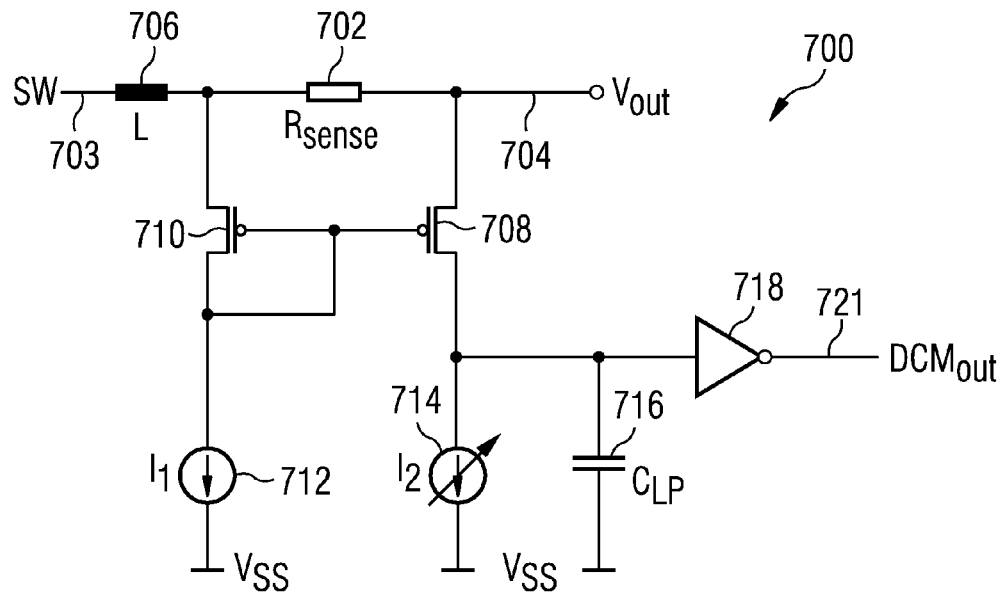
FIG. 7 illustrates a schematic of an embodiment current comparator circuit.

FIG. 7 illustrates a schematic of an embodiment current comparator circuit 700 having two transistors 708 and 710 coupled to a resistor 702. Inductor 706 and resistor 702 are connected in series between a first node 703 and a second node 704. A current source 712 may bias transistor 710 and a variable current source 714 may bias transistor 708. Variable current source 714 is set to a threshold current $I_2$ which may be chosen to correspond to a specific current flowing through resistor 702 and inductor 706. A current flowing through transistor 708 is inversely proportional to the current flowing through resistor 702. As the current flowing through resistor 702 decreases (which also means that the current flowing through inductor 706 decreases), current flowing through transistor 708 increases. When the current flowing through transistor 708 is above threshold current I2, a current flows into capacitor 716.

In some embodiments, capacitor 716 filters an input voltage of buffer 718. Buffer 718 drives output 721 that toggles when the current flowing through resistor 702 and inductor 706 exceeds a programmable threshold determined by threshold current I2. In some embodiments, buffer 718 may be an inverter as illustrated in FIG. 7. Output 721 may provide an active high or an active low signal. According to a specific example, output 721 provides a digital output signal.

Figure 8A:
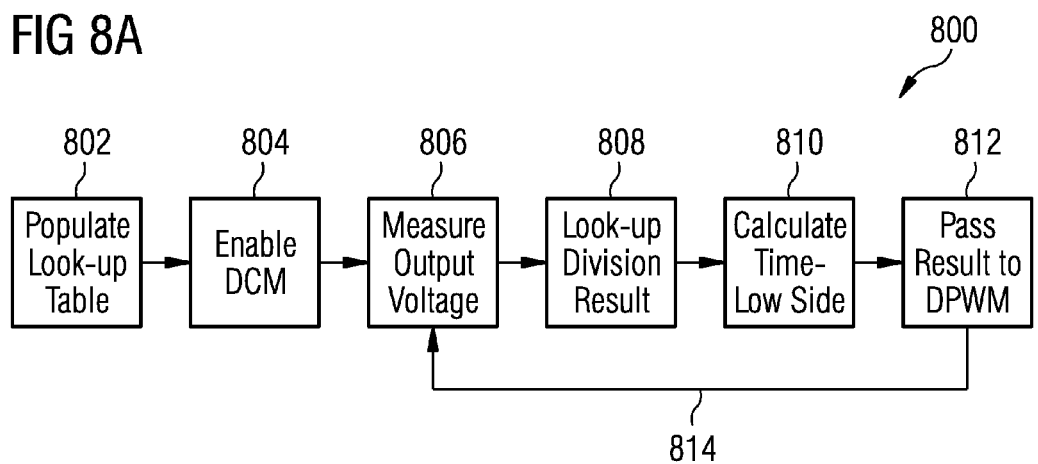
FIGS. 8a-b illustrate block diagrams of embodiment methods of operating a power supply system.
Figure 8B:
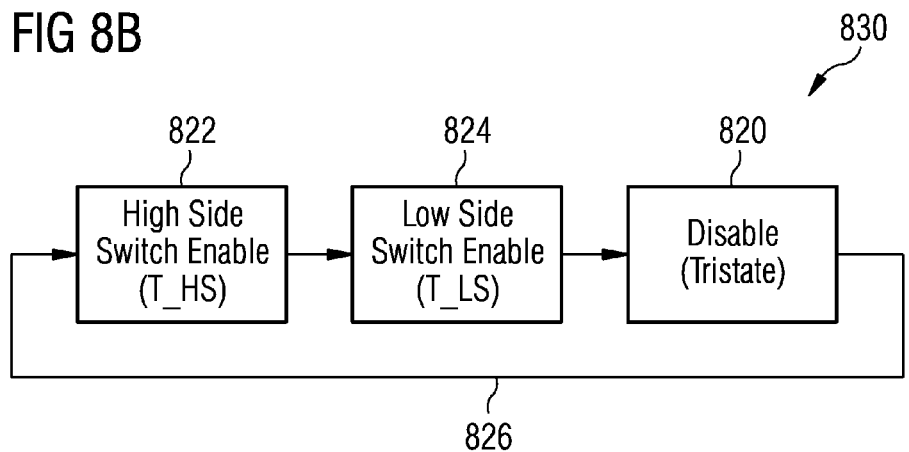

FIGS. 8*a-b* illustrate block diagrams of embodiment methods of operating a power supply system. FIG. 8*a* illustrates an embodiment method 800 of estimating an inductor current zero crossing in a switching power supply.

Method 800 includes first populating look-up tables in step 802. In some embodiments, step 802 may be omitted if relevant calculations are performed in real-time, for example, using a processor. After step 802, DCM is enabled in step 804, and an output voltage is measured in step 806, which may be a voltage across a load (such as loads 140, 240, and 340 in FIGS. 1-3). In an embodiment, the output voltage is a battery voltage during charging. After step 806, the output voltage is used in step 808 to look up a division result for $V_{in}/V_{out}$ to be used in the equation above. Using the division result from step 808 and the time period T_HS, calculation of T_LS is completed in step 810 and finally is provided to a switching block (such as DPWM block 336 in FIG. 3) in step 812. In various embodiments, the switching block includes circuitry to wait or count the time periods determined (T_HS, T_LS, and a remainder). The circuitry in the switching block may include a digital counter. In some embodiments, T_LS may be recalculated with a newly measured output voltage by going back to step 806 as illustrated by arrow 814. According to various embodiments, $V_{out}$ and/or $V_{in}$ may be measured once per switching period and the calculation of T_LS and/or T_HS may be performed during the switching period.

FIG. 8b illustrates an embodiment method 830 of controlling switches in a switching power supply during a mode of operation. In various embodiments, the mode of operation is DCM. Method 830 includes a high side switch enable step 822, a low side switch enable step 824, and a switch disable or tristate step 820. These steps can be continually repeated during DCM as shown by arrow 826. According to some embodiments, step 822 includes enabling a high side switch (such as switch 302 in FIG. 3) for time period T_HS, step 824 includes enabling a low side switch (such as switch 304 in FIG. 3) for time period T_LS, and step 820 includes disabling both the high side switch and the low side switch. According to various embodiments, the transition from step 822 to step 824 depends on a duty threshold and the transition from step 824 to step 820 depends on a zero crossing threshold. In the various embodiments, the zero crossing threshold may be digitally estimated.

Figure 9:
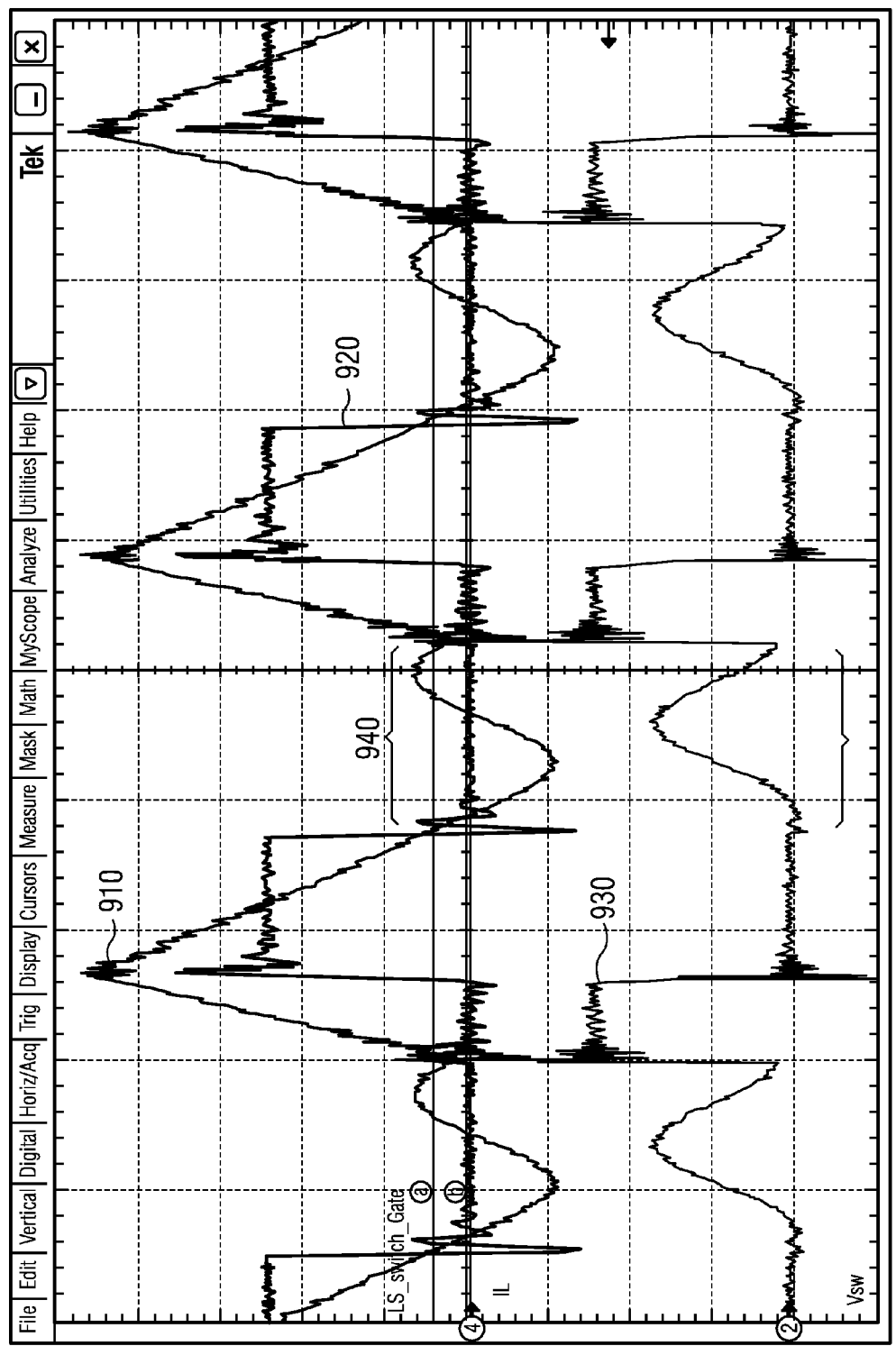
FIG. 9 illustrates a waveform of an embodiment system.

FIG. 9 illustrates a waveform of an embodiment power supply system during operation. Waveform 910 depicts an embodiment current flowing through an inductor or inductive element in a switching power supply with a high side switch and a low side switch. Waveform 920 depicts a voltage on a control node of the low side switch and waveform 930 depicts a voltage on an intermediate node (such as node 303 in FIG. 3). In the embodiment shown, when the inductor current shown by waveform 910 is increasing, the high side switch is closed (or conducting), as seen by the intermediate node voltage waveform going high, and the low side switch is open (or non-conducting). When the inductor current shown by waveform 910 stops increasing and begins decreasing, the high side switch is opened and the low side switch is closed, as can be seen by waveform 920 going high and waveform 930 going low. When the inductor current shown by waveform 910 reaches zero, the low side switch is opened as shown by waveform 920 going low. When both the high side switch and the low side switch are open during time period 940, the inductor current shown in waveform 910 is prevented from going very negative. In some embodiments, the inductor and switch capacitance of the low side transistor behave as an LC tank during time period 940, and the current and voltage oscillate temporarily. In an embodiment, time period 940 may correspond to a tristate phase during which both the high and low side switches are open.

FIG. 10 illustrates a block diagram of an embodiment method 1000 of operating a switching power supply circuit which includes asserting a first switching command 1010, asserting a second switching command 1020, and asserting a third switching command 1030 for a switching power supply. Method 1000 includes determining time 1040 that determines how long to continue asserting the second switching command 1020 before transition 1024.

According to an embodiment, first switching command 1010 may include charging inductor step 1012 during which an inductor in the switching power supply circuit is charged. Similarly, second switching command 1020 may include discharging inductor step 1022 during which the inductor is discharged and third switching command 1030 may include high impedance step 1032 during which the inductor is connected to a high impedance node.

In some embodiments, operating counter step 1050 may include operating a counter or delay system to provide transition 1014, transition 1024, and transition 1034 based on a first threshold, a second threshold, and a cycle period. The first threshold may depend on an electrical property of the load (e.g. current or voltage), the second threshold may depend on a predicted inductor current zero crossing, and the cycle period may be chosen based on system design characteristics.

According to an embodiment, method 1000 includes operating in DCM. Method 1000 may also include operating in CCM, during which transition 1016 may be used to transition repeatedly between asserting the first switching command 1010 and asserting the second switching command 1020. In a specific instance, DCM omits transition 1016 and includes transition 1024 to asserting the third switching command 1030.

FIG. 11 illustrates block diagram of another embodiment method 1100 of operating a switching power supply circuit that includes three modes: CCM, transition mode, and DCM. As previously described herein, a switching power supply circuit may be operated in CCM until an average current threshold is reached. When the average current threshold is reached, a controller may change the mode of operation of the switching power supply circuit from CCM to the transition mode. In some embodiments, if a load condition changes while the switching power supply circuit is in the transition mode, the controller may change back to operating in CCM. A changed load condition may include a higher current demand or voltage requirement, for example. In some embodiments, after a specific number of cycles, the controller may change to operate the switching power supply circuit in DCM. The number of cycles to remain in the transition mode may be adjustable and may take any value based on the system design and requirements.

According to various embodiments described herein, a controller for a switched mode power supply includes an average current comparator and a switch signal generation circuit coupled to the average current comparator. The average current comparator determines whether an average current within the switched mode power supply is below a current threshold. The switch signal generation circuit includes switch signal outputs that may be coupled to a switching circuit of the switched mode power supply. The switch signal generation circuit produces a first switching pattern at the switch signal outputs in a first mode of operation and produces a second switching pattern at the switch signal outputs in a second mode of operation. The switch signal generation circuit is operated in a first mode when the average current comparator determines that the average current is below the current threshold and in a second mode when the average current comparator determines that the average current is not below the current threshold.

According to another embodiment, the switch signal generation circuit is further configured to produce a third switching pattern at the switch signal outputs for a first number of switching cycles after the average current comparator determines that the average current is below the current threshold prior to producing the first switching pattern. In some embodiments, the first switching pattern is configured to operate the switched mode power supply in a discontinuous conduction mode (DCM), the second switching pattern is configured to operate the switched mode power supply in a continuous conduction mode (CCM), and the third switching pattern is configured to operate the switched mode power supply in a CCM to DCM transition mode.

According to various embodiments, the second switching pattern includes repeating cycles of alternatingly activating a first switch signal output and a second switch signal output, the first switching pattern includes repeating cycles of asserting a first switch state, followed by asserting a second switch state, followed by asserting a third switch state, and the third switching pattern comprises repeating cycles of asserting the first switch state and the third switch state. Asserting the first switch state may include activating the first switch signal output and deactivating the second switch signal output, asserting the second switch state may include deactivating the first switch signal output and activating the second switch signal output, and asserting the third switch state may include deactivating the first switch signal output and deactivating the second switch signal output.

In an embodiment, the controller determines a length of time for asserting the second switch state based on an input voltage and an output voltage of the switched mode power supply. The average current comparator may include an average current measurement circuit and a comparator.

According to an embodiment, a controller for a switched mode power supply includes a pulse width modulator configured to be coupled to a switching circuit of the switched mode power supply. In an embodiment, in a first mode, the pulse width modulator cyclically asserts a first switching command, a second switching command, and a third switching command to the switching circuit; and determines a length of time of the second switching command based on an input voltage and an output voltage of the switched mode power supply.

In various embodiments, the first switching command causes the switching circuit to charge an inductor coupled to an output port of the switched mode power supply, the second switching command causes the switching circuit to discharge the inductor coupled to the output port of the switched mode power supply, and the third switching command causes the switching circuit to attain a high impedance state.

In some embodiments, the pulse width modulator includes a counter and a first comparator coupled to an output of the counter. The pulse width modulator is configured to transition from asserting the second switching command to the third switching command when the first comparator determines that a value at the output of the counter crosses a first threshold. The first threshold is dependent on the input voltage and the output voltage of the switched mode power supply. In some embodiments, the counter includes a digital counter and the first comparator includes a digital comparator.

In some embodiments, the controller includes a second comparator coupled to an output of the counter, and the pulse width modulator transitions from asserting the first switching command to the second switching command when the second comparator determines that a value at the output of the counter crosses a second threshold. The second threshold may be determined according to at least one of an output voltage and an output current of the switched mode power supply.

In various embodiments, the pulse width modulator asserts the first switching command by activating a first switch output signal and deactivating a second switch output signal, asserts the second switching command by deactivating a first switch output signal and activating a second switch output signal, and asserts the third switching command by deactivating the first switch output signal and deactivating the second switch output signal. In an embodiment, the controller is configured to activate a tristate enable signal. Asserting the third switching command may include activating the tristate enable signal.

In various embodiments, the controller includes an average current comparator that determines whether an average current within the switched mode power supply is below a current threshold. The pulse width modulator may operate in a second mode when the average current comparator indicates that the average current is not below the current threshold. In the second mode, the pulse width modulator may cyclically assert the first switching command and the second switching command to the switching circuit. In some embodiments, the current threshold is an adjustable threshold. The first mode may include a discontinuous conduction mode (DCM) and the second mode may include a continuous conduction mode (CCM). In various embodiments, the controller transitions from the second mode to the first mode when the average current comparator determines that the average current is below the current threshold.

In various embodiments, the controller transitions from the second mode to a third mode of operation when the average current comparator determines that the average current is below the current threshold. In the third mode, the pulse width modulator cyclically asserts the first switching command and the third switching command to the switching circuit. The controller may also transition from the third mode to the first mode after a predetermined number of cycles of the third mode. In some embodiments, the controller transitions from the third mode back to the second mode if a load condition changes. The controller may also transition directly from the first mode to the second mode if a load condition changes.

According to various embodiments, a method of operating a switched mode power supply includes cyclically asserting a first switching command, a second switching command, and a third switching command to a switching circuit. The method also includes determining a length of time of the second switching command based on an input voltage and an output voltage of the switched mode power supply.

In some embodiments, the method includes charging an inductor coupled to an output port of the switched mode power supply using the switching circuit when asserting the first switching command, discharging the inductor coupled to the output port of the switched mode power supply using the switching circuit when asserting the second switching command, and placing the switching circuit in a high impedance state when asserting the third switching command.

In some embodiments, cyclically asserting includes operating a counter and transitioning from asserting the second switching command to asserting the third switching command when an output value of the counter crosses a first threshold. The first threshold may be dependent on the input voltage and the output voltage of the switched mode power supply. In an embodiment, cyclically asserting includes transitioning from asserting the first switching command to asserting the second switching command when an output value of the counter crosses a second threshold. The second threshold may be dependent on at least one of an output voltage or an output current of the switched mode power supply. In another embodiment, cyclically asserting further includes transitioning from asserting the third switching command to asserting the first switching command when an output value of the counter crosses a third threshold equal to a period of the switched mode power supply.

An advantage of various embodiments described herein includes the ability to implement DCM in a switching power supply system by predicting the inductor current zero transition points without having to measure the inductor current at each cycle, thereby reducing the size, cost and power consumption of power converter systems. A further advantage of some embodiments include the ability to accurately predict the discharge time of an inductor, thereby reducing the magnitude of negative current during DCM. Further benefits of such embodiments include higher efficiency.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

FIG. 12 illustrates a block diagram of an embodiment calculation block 1200 including threshold calculation unit 1210. Threshold calculation unit 1210 calculates zero crossing threshold $ZC_{thresh}$ based on input voltage $V_{in}$ for an SMPS and output voltage $V_{out}$ of the SMPS as described hereinabove in reference to the other figures. Threshold calculation unit 1210 also calculates duty threshold $D_{thresh}$ based on at least one of input voltage $V_{in}$ for the SMPS and output voltage $V_{out}$ of the SMPS as described hereinabove in reference to the other figures.

What is claimed is:

1. A controller for a switched mode power supply, the controller comprising:
an average current comparator configured to determine whether an average current within the switched mode power supply is below a current threshold; and
a pulse width modulator configured to be coupled to a switching circuit of the switched mode power supply, wherein, in a first mode, the pulse width modulator is configured to
cyclically assert a first switching command, a second switching command, and a third switching command to the switching circuit; and
calculate a length of time of the second switching command based on an input voltage and an output voltage of the switched mode power supply; and
wherein the pulse width modulator is further configured to operate in a second mode when the average current comparator indicates that the average current is not below the current threshold, wherein, in the second mode, the pulse width modulator is configured to cyclically assert the first switching command and the second switching command to the switching circuit.

2. The controller of claim 1, wherein:
the first switching command is configured to cause the switching circuit to charge an inductor coupled to an output port of the switched mode power supply;
the second switching command is configured to cause the switching circuit to discharge the inductor coupled to the output port of the switched mode power supply; and
the third switching command is configured to cause the switching circuit to attain a high impedance state.

3. The controller of claim 1, wherein the pulse width modulator is configured to:
assert the first switching command by activating a first switch output signal and deactivating a second switch output signal;
assert the second switching command by deactivating the first switch output signal and activating the second switch output signal; and
assert the third switching command by deactivating the first switch output signal and deactivating the second switch output signal.

4. The controller of claim 3, wherein the controller is further configured to activate a tristate enable signal, and wherein asserting the third switching command comprises activating the tristate enable signal.

5. The controller of claim 1, wherein the current threshold is an adjustable threshold.

6. The controller of claim 1, wherein the first mode comprises a discontinuous conduction mode (DCM) and the second mode comprises a continuous conduction mode (CCM).

7. The controller of claim 1, wherein the controller is further configured to transition from the second mode to the first mode when the average current comparator determines that the average current is below the current threshold.

8. The controller of claim 1, wherein the controller is further configured to:
transition from the second mode to a third mode when the average current comparator determines that the average current is below the current threshold, wherein, in the third mode, the pulse width modulator is configured to cyclically assert the first switching command and the third switching command to the switching circuit.

9. The controller of claim 8, wherein the controller is further configured to transition from the third mode to the first mode after a predetermined number of cycles of the third mode.

10. The controller of claim 8, wherein the controller is further configured to transition from the third mode back to the second mode if a load condition changes.

11. The controller of claim 8, wherein the controller is further configured to transition directly from the first mode to the second mode if a load condition changes.

12. The controller of claim 1, wherein calculating the length of time of the second switching command comprises using a look-up table.

13. The controller of claim 1, wherein
a length of time of the first switching command is given by T1;
the length of time of the second switching command is given by T2;
the input voltage is given by VIN;
the output voltage is given by VOUT; and calculating the length of time of the second switching command comprises calculating using an equation T2=T1*(VIN/VOUT−1).

14. A controller for a switched mode power supply, the controller comprising:
a pulse width modulator configured to be coupled to a switching circuit of the switched mode power supply, wherein, in a first mode, the pulse width modulator is configured to
cyclically assert a first switching command, a second switching command, and a third switching command to the switching circuit; and
determine a length of time of the second switching command based on an input voltage and an output voltage of the switched mode power supply;
a counter; and
a first comparator coupled to an output of the counter, wherein the pulse width modulator is further configured to transition from asserting the second switching command to the third switching command when the first comparator determines that a value at the output of the counter crosses a first threshold, and the first threshold is dependent on the input voltage and the output voltage of the switched mode power supply.

15. The controller of claim 14, wherein:
the counter comprises a digital counter; and
the first comparator comprises a digital comparator.

16. The controller of claim 14, further comprising a second comparator coupled to an output of the counter, wherein the pulse width modulator is further configured to transition from asserting the first switching command to the second switching command when the second comparator determines that a value at the output of the counter crosses a second threshold.

17. The controller of claim 16, wherein the second threshold is determined according to at least one of an output voltage and an output current of the switched mode power supply.

18. A method of operating a switched mode power supply, the method comprising:
comparing an average current within the switched mode power supply to a current threshold using an average current comparator;
operating the switched mode power supply in a first mode when the average current is below the current threshold, the first mode comprising:
cyclically asserting a first switching command, a second switching command, and a third switching command to a switching circuit; and
calculating a length of time of the second switching command based on an input voltage and an output voltage of the switched mode power supply; and
operating the switched mode power supply in a second mode when the average current is not below the current threshold, the second mode comprising cyclically asserting the first switching command and the second switching command to the switching circuit.

19. The method of claim 18, further comprising:
charging an inductor coupled to an output port of the switched mode power supply using the switching circuit when asserting the first switching command;
discharging the inductor coupled to the output port of the switched mode power supply using the switching circuit when asserting the second switching command; and
placing the switching circuit in a high impedance state when asserting the third switching command.

20. The method of claim 18, wherein calculating the length of time of the second switching command comprises using a look-up table.

21. The method of claim 18, wherein
a length of time of the first switching command is given by T1;
the length of time of the second switching command is given by T2;
the input voltage is given by VIN;
the output voltage is given by VOUT; and
calculating the length of time of the second switching command comprises calculating using an equation T2=T1*(VIN/VOUT−1).

22. A method of operating a switched mode power supply, the method comprising:
cyclically asserting a first switching command, a second switching command, and a third switching command to a switching circuit; and
determining a length of time of the second switching command based on an input voltage and an output voltage of the switched mode power supply, wherein cyclically asserting comprises:
operating a counter; and
transitioning from asserting the second switching command to asserting the third switching command when an output value of the counter crosses a first threshold, wherein the first threshold is dependent on the input voltage and the output voltage of the switched mode power supply.

23. The method of claim 22, wherein cyclically asserting further comprises:
transitioning from asserting the first switching command to asserting the second switching command when an output value of the counter crosses a second threshold, wherein the second threshold is dependent on at least one of an output voltage or an output current of the switched mode power supply.

24. The method of claim 22, wherein cyclically asserting further comprises:
transitioning from asserting the third switching command to asserting the first switching command when an output value of the counter crosses a third threshold equal to a period of the switched mode power supply.

* * * * *